United States Patent Office 2,974,949
Patented Mar. 14, 1961

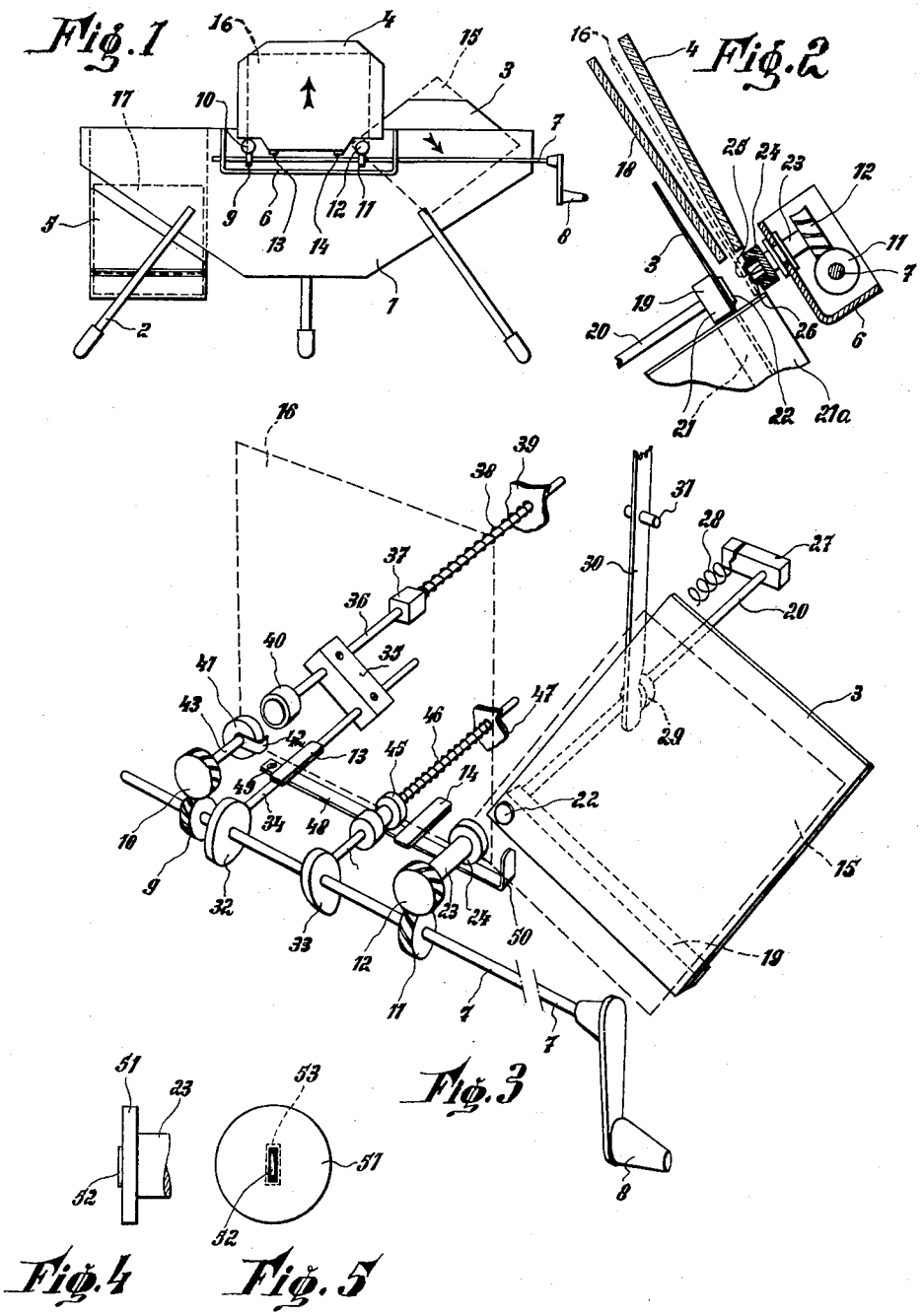

2,974,949
DEVICES FOR SEPARATING CUT FILMS FROM A STACK

Rudolf Zoglmann, Delft, Netherlands, assignor to N.V. Optische Industrie De Ould Delft, Delft, Netherlands Filed July 28, 1959, Ser. No. 829,997

Claims priority, application Netherlands Aug. 19, 1958

5 Claims. (Cl. 271—18)

The invention relates to a device for separating cut films from a stack one by one. Such devices are frequently used nowadays in photographic cameras, particularly mirror cameras, which have as is well-known, a curved image surface, viewers, automatic developing machines for cut films and similar apparatus.

It is a difficult problem to make such a device work reliably in that it picks up one and no more than one film at a time from the stack and supplies it to the further conveying means in the apparatus at a reasonable speed. As to that many proposals have been made already. It is well-known for instance to press a sucker against the uppermost film of the stack, into which sucker air is admitted after this film has been separated so that the film is set free again. It is also known to use a reciprocating finger which during the forward stroke pushes its sharp edge against the rim of the uppermost film only and shears this film from the stack. In order to increase the reliability, there is proposed to substitute the sharp edge for a crook, which engages the rim of the film, while prior thereto, in order to obtain the necessary free space for the crook, the uppermost film is pressed into an arched shape by pinching it from its side edges. Though particularly the last mentioned method gives rather satisfactory results, there is a need for a device for the aforementioned purpose which has a simpler construction and a less critical adjustment.

According to the invention this need can be met by a device characterized by a rotatable separating member which is provided near one of the corners of the film stack and opposite the foremost film and which is adapted to frictionally engage the foremost film over a relatively small surface and to be rotated about an axis perpendicular to the films.

The reliable operation of the device is due to the fact that the foremost and the next film in the stack are pressed against each other by the separating member over a very small part of their surfaces; therefore the friction between them is made very small. The position of the separating member relative to the stack of films need not be adjusted to such precision as with some of the known devices, whilst the force by which the films are pressed against the separating member also does not require a very precise adjustment. Preferably, this force is determined empirically, such that the first film is surely taken off at the rotation of the separating member but, on the other hand, the friction between the first film and the remainder of the stack is not so strong as to have two or more films removed at the same time.

At preference the separating member is provided with a disc or a ring adapted to be pressed against the foremost film and which consists of rubber or like material having a high friction coefficient. It is clear that the friction between this disc or ring and the film is much stronger than the friction between the smooth surfaces of the photographic films. Consequently the foremost film is easily separated from the stack. To fix the axis of rotation of the film it is recommended to provide the separating member with a needle which is situated in the axis of the member and projects a small distance beyond the contact surface of the disc or ring with the foremost film. When the separating member contacts the film, the needle is pressed into the foremost film, with the result that uncontrolled movements of the film are eliminated. It is also possible to support the friction between the separating member and the foremost film by means of a notch or pen mounted in the axis of the separating member and having a non-circular, preferably elongated rectangular cross section. This notch may project beyond the contact surface of the separating member a distance smaller than the thickness of one film and cooperate with holes of substantially the same shape in the film. When the separating member is positioned against the films the notch is received by the hole in the foremost film, with the result that the film will surely be separated from the stack of films at the subsequent rotation of the separating member.

The invention will be set forth more clearly hereinafter when describing an embodiment of the separating device as applied to a viewer which is represented diagrammatically by the Figures 1–5 of the drawing.

Herein represents:

Fig. 1 the viewer in elevation;

Fig. 2 the separating device in cross-section;

Fig. 3 the complete transport mechanism of the viewer in perspective, the cover plate and several other parts having been omitted for the sake of clarity;

Figs. 4 and 5 are views of a modified separating member.

In Fig. 1 item 1 is the front plate of the viewer, which is supported by three legs, such as 2. A pressure plate for the stack of films is designated 3. This plate is backwardly inclined and accommodated in a sloping channel, not shown in Fig. 1. In cross-section the channel has the shape of an erect V. In Fig. 2 one of the legs of this V can be seen and is indicated by 21a. The pressure plate 3 is fixedly mounted on a rod 20 (Fig. 2) and is pressed in upward and forward direction in its V-shaped channel by a spring. Before plate 3 the stack of films to be viewed can be placed into the sloping channel 21a. A transparent plate 4 mainly serves as a guide for the films in cooperation with an opal glass plate 18, behind which a light source (not shown) can be placed. 15 designates a film which is still situated in front of the pressure plate 3, 16 a film which has been positioned between plates 4 and 18 in order to be viewed, 17 a film which after having been viewed has been removed into the take-up magazine 5. The films are conveyed by means of a handle 8, as will be described hereafter. This handle 8 is mounted on the end of shaft 7 fixed in frame 6. Two screw wheels 9 and 11 are mounted on the shaft 7 and are in gear with two screw wheels 10 and 12 respectively fixed on parallel shafts which cross at right angles the driving rod 7. 13 and 14 are two stops for the film.

In Fig. 2 it is shown that the screw wheel 12 is mounted on a shaft 23 which is perpendicular to the films and carries at its other end the separating member according to the invention. In the embodiment shown this member consists of a metal cup 24, receiving a rubber ring 26 which projects from the cup a small distance and further being provided with a needle 25. This needle is mounted in the axis of the cup and projects slightly beyond the rubber ring 26. The stack of films to be viewed lies in the V-shaped channel nutated through an angle of 135° with respect to the viewing position (see the arrows on the films in Fig. 1). The stack is pressed upward and forward by plate 3, till it comes into contact at one of its corners with the rubber ring 26 of the separating member. Opposite the ring, the separating member plate 3 is provided with a flat pressing element 22 whereby the rearmost film does not contact the pressure plate over its complete surface. Plate 3 is further provided with a strip 19, wherein the pressing rod 20 is fitted.

As shown in Fig. 3, rod 20 carries on its rear end a block 27 to which the spring 28 is connected. Furthermore a ring 29 is fixed in the middle of rod 20 and is operated by a lever 30, revolving about a shaft 31. The lever can be operated by the user thus enabling the latter to shift back the plate 3 and to put a stack of cut films into the channel 21a.

Screw wheel 10 is mounted on a rod 43 which carries on its other end an element 41 which, in the apparatus shown, has a partly similar function as the separating member 24, 25, 26, i.e. the rotation of cut films. Thus, this element can be constructed in the same manner as a rubber cup or ring. Opposite the element 41, on the other side of the film 16 an idling counter roller 40 is mounted on a shaft 36. A pressing spring 38 on one end connected to part 39 of the housing and on the other end to a block 37, presses roller 40 in the direction of element 41. Roller 40 can be retracted against the action of the spring 38 by a cam disc 32 mounted on driving rod 7 and a pushing rod 34, which is connected to the shaft 36 by means of a block 35. The stack of films can be moved backward in order to be made free from the member 24 by means of a lever 48, the end of which is bent at right angles and is situated before the stack of films. The lever can be turned about a shaft 49 and carries a pin (not shown), which is positioned between the flanges of a member 45. The member 45 has been rigidly mounted on a pushing rod 44 which is pressed against a cam disc 33 on driving rod 7 by means of a spring 46 situated between a part 47 of the housing and the carrier 46.

The device operates as follows: After pressing plate 3 had been retracted by turning lever 30 about shaft 31, the stack of films can be placed into the channel 21a. While the lever 30 is set free, spring 28 pulls forward the pressing plate till the foremost film 15 is engaged by the rubber ring 26 of the separating member. At the same time needle 25 penetrates the film thereby defining the point of rotation of the film. When the handle 8 is turned the rubber ring makes the foremost film to rotate by friction through an angle of about 135° till it is stopped by one of the stops 13 and 14. At this time the counter roller 40 is in its retracted position under control of cam disc 32, so that the lower edge on the left side of the first film can fall between the element 41 and the counter roller 40. During the whole tilting movement the film is guided by the plates 4 and 18. The image on the film can be viewed now.

In order to view the next film, the handle 8 is turned again in the same direction. At first this results in a rotation to the left of lever 48 by means of the cam disc 33 and a pushing rod 44, whereby the end 50 of this lever pushes backward the stack of films and sets free the separating member. Immediately after this cam disc 32 allows spring 38 to press the counter roller 40 against the rear surface of the film. Owing to this the element 41 will tilt over the film 16 in the same manner as described above, when handle 8 is turned further. In the meantime lever 48 returns to its starting position, with the result that the next film comes into contact with the separating member and is tilted over into the viewing position. Just before this position is reached, roller 40 is retracted, with the result that the first film is set free and falls into the take-up magazine 5. To facilitate this action a hook 42 is mounted on the element 41 which engages the rim of the film and pushes it away.

It is observed that it is not necessary for the film to be in the desired final position immediately after completion of the first tilting movement as is the case in the described viewer.

In a developing machine f.i., the film will be picked-up by conveying means known per se and not forming a subject of the present invention, which will advance the films through a series of processing baths. In a photographic camera it will be generally required that the films after separation are transported to the image area. For this purpose well-known conveying means can be used, the simplest form of which is that wherein the film is made to fall down along a pair of guiding bars. In the Figures 4 and 5 a modified form of separating member has been shown. This member is adapted to cooperate with films having a perforation near one of the corners, and can be incorporated in the apparatus disclosed while maintaining all other parts of the device unchanged. It consists of a disc 51 mounted on the end of shaft 23. This disc carries a projection 52 having rectangular cross-section. This notch fits amply in the perforation 53 of the films (see Fig. 5) so that it is not necessary for the films to be positioned very precisely.

What I claim is:

1. In a device having means for holding collectively a stack of uniformly cut pieces of film, means for sequentially moving the film, piece by piece, from one end of the stack, to an operative position and then to a re-stacked collective position, said moving means comprising a film separating member mounted for rotation about an axis perpendicular to said stack and having a free end defining a contact surface positioned opposite a corner of the foremost film piece in the stack, said contact surface having a high coefficient of friction; a first biasing means for biasing the stack toward the contact surface to engage the foremost piece of film with said contact surface; means for rotating the separating member about said longitudinal axis and thereby rotating the foremost piece of film in its own plane to the operative position; a first reciprocal means, responsive to said rotating means, for retracting said stack from contact with the contacting surface between preselected points in each revolution of said rotating means to release each foremost film piece in said operative position; an element similar to said separating member and having a similar contact surface, said element mounted for rotation, and rotated by said rotating means, and having said contact surface positioned opposite a second corner of each piece of film successively in the operative position; a second biasing means, opposing said element, for biasing said second corner of each said film piece into contact with the contact surface of said element, and, when rotated by said rotating means, causing the rotation in the same plane of each said film piece in the operative position to the retracted collective position; a second reciprocal means responsive to said rotating means for retracting said second biasing means between preselected points in each revolution of said rotating means, the preselected points of said first and second biasing members being selected to alternately cause the gripping and releasing of said separate corners of each film piece respectively, and, in opposite sequence, between their respective biasing means and the respective rotatable opposing stack separating member and the similar element, the gripping and releasing at one said corner corresponding to the releasing and gripping at other said corner, thereby rotating in turn each film piece successively and in the same plane from the stack of films to an operative position to a restacked collective position.

2. In a device having means for holding collectively a stack of uniformly cut pieces of film, means for sequentially moving the film, piece by piece, from one end of the stack, to an operative position and said moving means comprising a film separating member mounted for rotation about an axis perpendicular to said stack and having a free end defining a contact surface positioned opposite a corner of the foremost film piece in the stack, said contact surface having a high coefficient of friction, a biasing means for biasing the stack toward the contact surface to engage the foremost piece of film with said contact surface; means for rotating the separating member about said longitudinal axis and thereby rotating the foremost piece of film in its own plane to the operative position; a reciprocal means, responsive to said rotating means, for retracting said stack from contact with the contacting surface between preselected points in each revolution of said rotating means to release each foremost film piece in said operative position.

3. Device according to claim 2, wherein the separating member is provided with a disc or ring of rubber or similar material having a high friction-coefficient, which can be pressed against the foremost film.

4. Device according to claim 2, wherein the separating member is provided with a needle situated in the axis of the separating member and projecting a small distance beyond the contact surface of the disc or ring and the foremost film.

5. Device according to claim 2, wherein the separating member is provided with a projection mounted in the axis of the separating member and having a non-circular and preferably rectangular cross-section, said projection projecting beyond the contact surface of the separating member and the foremost film a distance smaller than the thickness of the film and cooperating with perforations of corresponding shape in the films.

References Cited in the file of this patent

FOREIGN PATENTS

| | | |
|---|---|---|
| 411,384 | Great Britain | June 7, 1934 |
| 215,718 | Australia | June 24, 1958 |